United States Patent Office 3,394,157
Patented July 23, 1968

3,394,157
PROCESS FOR THE REDUCTION OF THIOLESTERS TO SULFIDES
Donald E. Bublitz, Concord, Calif., assignor to The Dow Chemical Company, Midland, Mich., a corporation of Delaware
No Drawing. Filed Dec. 16, 1964, Ser. No. 418,870
7 Claims. (Cl. 260—439)

ABSTRACT OF THE DISCLOSURE

Organic thiolesters are selectively reduced to the corresponding sulfide by lithium aluminum hydride modified by addition of a Group III–A metal halide. Preferably the lithium aluminum hydride is modified by addition of about 0.8 to 1.2 moles of aluminum chloride per mole $LiAlH_4$. The reduction

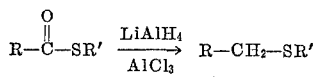

is smooth and rapid giving good yields of the desired sulfide.

---

$LiAlH_4$ is an exceedingly useful and powerful reagent which reacts with nearly all reducible organic functional groups. It is particularly effective for reducing carbonyl groups. With aldehydes, ketones and amides the usual product is an alcohol or amine having the same carbon skeletal structure as the original compound. In contrast, esters and thiolesters normally are cleaved during reduction with $LiAlH_4$ forming two products, one an alcohol having the skeletal structure of the acid moiety and the other an alcohol or mercaptan having the structure of the remaining portion of the original ester. For example, reduction of cyclohexyl thiobenzoate with $LiAlH_4$ gives benzyl alcohol and cyclohexyl mercaptan.

Reductions with $LiAlH_4$ are normally carried out using an ether as solvent and diluent. Diethyl ether, tetrahydrofuran and the dimethyl ether of diethylene glycol (diglyme) are frequently used. These ethers are resistant to attack by $LiAlH_4$ and generally have little effect on the reducing properties of $LiAlH_4$. Often they are used interchangeably.

The reducing properties of $LiAlH_4$ can, however, be modified by the addition of certain inorganic salts such as aluminum chloride. Nystrom and Berger [J. Am. Chem. Soc., 80, 2896 (1958)] reported that an equimolar mixture of $LiAlH_4$ and aluminum chloride was a stronger reducing agent than $LiAlH_4$ alone, reducing aromatic aldehydes and ketones to the corresponding hydrocarbons rather than alcohols.

It has now been discovered that the reduction of thiolesters with $LiAlH_4$ is markedly influenced by the addition of a Group III–A metal halide in the presence of certain ether diluents. For example, reduction of cyclohexyl thiolbenzoate with $LiAlH_4$ modified by the addition of $AlCl_3$ in diethyl ether or p-dioxane gives a high yield of benzyl cyclohexyl sulfide, whereas in tetrahydrofuran, 1,2-dimethoxyethane or diglyme the product is predominantly benzyl alcohol and cyclohexyl mercaptan.

Since the initial thiolesters are readily prepared from an appropriate acid halide and thiol, the selective reduction of the thiolesters to the corresponding uncleaved sulfides provides a new and convenient synthesis for many organic sulfides, some of which are not easily prepared by other methods. These resulting sulfides are useful intermediates in chemical synthesis. They can be oxidized as described by Goodhue et al. in U.S. Patent 2,957,799 to sulfoxides useful as insecticides. They can be used as additives to suppress carbonization in gasoline engines and as moderators or promoters in polymerization processes.

Essential elements in this new process for the synthesis of an organic sulfide by reduction of the corresponding thiolester with $LiAlH_4$ modified by addition of a metal halide, are the metal halide, the mole ratio of the metal halide and $LiAlH_4$, the solvent, and the thiolester.

Suitable modifiers for the $LiAlH_4$ reduction of the thiolesters are Group III–A metal halides of the formula $MX_3$ where M is aluminum, gallium, indium or thallium and X is chlorine, bromine or iodine. Because of availability and cost, aluminum salts and particularly aluminum chloride are preferred in practice.

To obtain significant yields of the desired sulfides requires at least 0.3 mole of $MX_3$ per mole of $LiAlH_4$. Optimum yields of the sulfide are normally obtained using about 1 mole $MX_3$ per mole $LiAlH_4$ and 1.0–1.2 moles of $LiAlH_4$ per mole of thiolester. While more than 1 mole of $MX_3$ can be used per mole $LiAlH_4$, there is no advantage in more than a 2–3 fold excess of $MX_3$. Indeed, using more than 3 moles of $AlCl_3$ per mole of $LiAlH_4$ can result in a loss of the active reducing species as well as complicate the product recovery. Hence, the practical process limits range from 0.3 to 3.0 moles $MX_3$ per mole $LiAlH_4$ with a preferred ratio of 0.8–1.2.

The course of the thiolester reduction with the modified $LiAlH_4$ reagent is greatly influenced by the solvent. Suitable solvents for obtaining the uncleaved sulfide are $di(C_1-C_4$ alkyl) ethers and p-dioxane. While diethyl ether and diisopropyl ether are often preferred because of availability, water-insolubility, and low boiling points, other ethers such as di-n-propyl ether, methyl n-butyl ether and methyl n-propyl ether can be used. p-Dioxane is a good reaction medium although its water solubility may complicate product recovery. In contrast with tetrahydrofuran, 1,2-dimethoxyethane and diglyme the desired sulfides are obtained only in low yield.

Clearly, the ether is more than an inert diluent. The exact nature of its interaction with the $LiAlH_4$-$MX_3$ reagent is not known. With added $AlCl_3$ the active reducing agent may be a solvated $AlHCl_2$ or $AlH_2Cl$ species which because of steric factors becomes highly selective in its reducing action. Complex formation between $AlCl_3$ and ethers is of course well known.

The reduction of thiolesters to the corresponding sulfides with the modified $LiAlH_4$ reagent in a suitable solvent such as diethyl ether, e.g. the reaction:

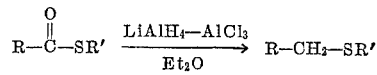

is a general reaction for many organic thiolesters. R can be an alkyl, alkenyl, cycloalkyl, cycloalkenyl, aryl, aralkyl, alkaryl or ferrocenyl group, in general, any organic or organometal group free of substituents which interact to consume the $LiAlH_4$ reagent, unless of course reduction is also desired at another site. Only with phenyl thiolesters (R'=aryl) has this process failed to give the uncleaved sulfide as the predominant product. Thus R' can be an alkyl, alkenyl, cycloalkyl or other organic hydrocarbon group except for aryl. The process is particularly suitable for organic thiolesters where R and R' are $C_1-C_{20}$ hydrocarbon groups such as methyl, allyl, propargyl cyclohexyl, vinylcyclohexyl, 10-undecenyl, 2-ethylhexyl, n-dodecyl, and the like, and where R is phenyl, tolyl or xylyl.

To achieve high conversion and yield without recycling unreacted thiolester requires at least one mole of $LiAlH_4$ per mole of thiolester. With less than an equimolar amount of $LiAlH_4$, the yields are reduced even with recycling of unreacted thiolester. Since recovery of excess $LiAlH_4$ is difficult, use of 1.0–1.2 moles of $LiAlH_4$ per mole of thiolester is generally preferred.

Reduction with the modified $LiAlH_4$ reagent is similar to conventional $LiAlH_4$ reductions. The presence of water, peroxides and other impurities which react with $LiAlH_4$ must be minimized. Usually the modified $LiAlH_4$ reagent is prepared by adding a solution of $AlCl_3$ in the desired ether diluent to a solution or slurry of $LiAlH_4$ in the same diluent. Then the thiolester is added, often as an ether solution, at a rate adequate to maintain the desired reaction temperature. The reduction usually is rapid and exothermic at room temperature. Usually a temperature of 20–40° C. is desirable but lower temperatures of 0° or below can be used for reactive systems while higher temperatures up to the reflux temperature of the mixture can be used for less reactive thiolesters. Normally atmospheric pressure is used, but moderate elevated pressures can be employed if required.

The reduction is generally complete a few minutes after adding the thiolester. To insure maximum yield, the mixture often is stirred another 0.5 to 1.0 hour or more. Then excess $LiAlH_4$ is destroyed by careful hydrolysis and the product is recovered in a conventional manner.

The following examples illustrate further the invention described herein, but are not to be construed as limiting its scope. Within this general scope, optimum conditions for a given reaction can be determined in a routine manner. Unless otherwise stated all parts and percentages are by weight.

Example 1.—Reduction of thiolesters with $LiAlH_4$-$MX_3$

The reduction of cyclohexyl thiolbenzoate is a convenient test system as the possible products benzyl cyclohexyl sulfide, benzyl alcohol and cyclohexyl mercaptan are easily determined by vapor phase chromatography. The reaction occurs readily at ambient temperature and the products are stable to normal processing conditions.

(A) To a stirred solution of 2.0 parts (0.053 mole) $LiAlH_4$ and 6.0 parts (0.045 mole) $AlCl_3$ in 100 parts of ethyl ether was added dropwise in 15–20 minutes a solution of 4.2 parts (0.019 mole) of cyclohexyl thiolbenzoate in 70 parts of ethyl ether. The reaction mixture was refluxed an hour before decomposing the excess hydride by careful addition of water. The ether layer was separated, dried over anhydrous $MgSO_4$, and concentrated giving 3.2 parts (81 percent yield) of benzyl cyclohexyl sulfide. The liquid product had by vapor phase chromatography a minimum purity of 95 percent.

(B) To a stirred solution of 1.0 (0.026 mole) $LiAlH_4$ in 70 parts ethyl ether was added dropwise a solution of 3.4 parts (0.020 mole) gallium chloride in 35 parts of ether. The mixture was refluxed for 30 minutes and then 2.1 parts (0.009 mole) cyclohexyl thiolbenzoate in 35 parts of ether was added dropwise. The reaction mixture was refluxed for 2 hours, cooled, and hydrolyzed. From the ether layer was recovered 1.6 parts (82 percent) of benzyl cyclohexyl sulfide having a minimum purity of 90–95 percent.

(C) In a run similar to run 1B, but using 5.0 parts (0.023 mole) of indium chloride in place of the gallium chloride, 1.7 parts (86 percent) of benzyl cyclohexyl sulfide was obtained.

(D) In another run, the reduction described in 1A was repeated without $AlCl_3$ or other added Group III–A metal halide. No benzyl cyclohexyl sulfide was found, the products being instead benzyl alcohol and cyclohexyl mercaptan.

(E) Simiar reductions of cyclohexyl thiolbenzoate with $LiAlH_4$ modified by the addition of halides of metals other than Group III–A, for example $SnCl_4$, $FeCl_3$, and $TiCl_4$, gave predominately cleavage products with less than 10 to 20% of the desired benzyl cyclohexyl sulfide.

Example 2.—Reactant ratios

Typical data from a series of runs made using cyclohexyl thiolbenzoate and the general procedure of Example 1A are summarized in Table 1. The product mixtures were determined in most cases by vapor phase chromatography.

Optimum yields are generally found using a slight excess based on the thiolester and an equimolar mixture of $LiAlH_4$ and $AlCl_3$ as in Run 2–2. To achieve substantially complete reduction of the thiolester, about 1 mole $LiAlH_4$ per mole of thiolester is required. With insufficient $LiAlH_4$ excess $AlCl_3$ is detrimental (Runs 2–6, 2–7). With less than 0.3 mole $AlCl_3$ per mole $LiAlH_4$, the crude product is almost entirely benzyl alcohol and cyclohexyl mercaptan.

TABLE 1.—REACTANT RATIOS

| Run: | Mole Ratio of Reactants | | | Yield of Benzyl Cyclohexyl Sulfide, percent |
|---|---|---|---|---|
| | Thiolester | $LiAlH_4$ | $AlCl_3$ | |
| 1A | 1.0 | 2.8 | 2.4 | 81 |
| 2–1 | 1.0 | 1.4 | 3.6 | 82 |
| 2–2 | 1.0 | 1.2 | 1.2 | 93 |
| 2–3 | 1.0 | 0.5 | 0.5 | 60 a |
| 2–4 | 1.0 | 0.5 | 1.5 | 39 a |
| 2–5 | 1.0 | 0.25 | 0.75 | 20 a |
| 2–6 | 1.0 | 1.0 | 0.5 | 40 b |
| 2–7 | 1.0 | 1.0 | 0.25 | 5 b |
| 1D | 1.0 | 2.8 | 0 | 0 b | a The product contained unreacted thiolester.
b Major products were benzyl alcohol and cyclohexyl mercaptan.

Example 3.—Ether diluents (A) To a stirred suspension of 1.0 part (0.026 mole) $LiAlH_4$ in 100 parts of purified p-dioxane was added a solution of 3.0 parts (0.022 mole) $AlCl_3$ in about 100 parts of p-dioxane. The mixture was stirred for 15 minutes, cooled to room temperature and then 1.0 part (0.05 mole) cyclohexyl thiolbenzoate in 20 parts of p-dioxane was slowly added. The mixture was stirred for an hour at room temperature and then hydrolyzed by careful addition of 500 parts of water. The solution was extracted with ether. After drying the ether extract, the solvent was removed giving a good yield of benzyl cyclohexyl sulfide.

(B) Repeating the above reaction with diisopropyl ether as the diluent gave a 75–80% yield of recovered benzyl cyclohexyl sulfide.

(C) When tetrahydrofuran or 1,2-dimethoxyethane were used as the reaction medium in similar experiments, only traces of benzyl cyclohexyl sulfide were found, the major products being benzyl alcohol and cyclohexyl mercaptan.

(D) To a mixture of 3.0 parts (0.078 mole) of $LiAlH_4$, 4.0 parts (0.030 mole) of $AlCl_3$ in 100 parts of diglyme purified by distillation from sodium was added a solution of 5.5 parts (0.036 mole) methyl thiolbenzoate in diglyme. Reaction occurred readily at room temperature with the odor of methyl mercaptan most evident. The mixture was hydrolyzed with water and the resulting solution concentrated by distillation of the diglyme-water azeotrope. Infrared analysis of the distillation residue established that benzyl alcohol was the major residual product. Similar results have been observed in the reduction of cyclohexyl thiolbenzoate with $LiAlH_4$–$AlCl_3$ with diglyme as the reaction medium.

Example 4.—Thiolesters

The general utility of the $LiAlH_4$–$MX_3$ reagent in reducing thiolesters to the corresponding uncleaved sulfides is revealed by the variety of thiolesters shown in Table 2.

The initial thiolesters were most conveniently prepared from the corresponding acid chloride and mercaptan although other methods are known. In a typical synthesis, a solution of 29.2 parts (0.2 mole) of cyclohexanecarbonyl chloride and 26.0 parts (0.2 mole) of $AlCl_3$ in 270 parts of methylene chloride was added at 0° C. to a stirred mixture of 12.4 parts (0.2 mole) of ethyl mercaptan in 270 parts of methylene chloride. The resulting mixture was stirred for an hour at 0° C., refluxed for 10 minutes and then poured onto ice. From the organic phase was recovered 30.0 parts (87% yield) of S-ethyl cyclohexylcarbothioate.

The reductions were carried out following the general procedure of Example 1A using 1.2–1.4 moles LiAlH₄ per mole thiolester, 0.85–1.0 mole AlCl₃ per mole LiAlH₄, diethyl ether as the diluent and a reaction temperature of 20–33° C. Optimum conditions and yields were not established in these runs. However, the data in Table 2 does indicate the general utility of the process. Only with phenyl thiolesters (Runs 4–8, 9) has the cleavage reaction been found to predominate with the LiAlH₄–AlCl₃ reagent.

TABLE 2.—REDUCTION OF THIOLESTERS WITH LiAlH₄-AlCl₃

| Run: | Thiolester | Product |
|---|---|---|
| 4-1 | Methyl Thiolbenzoate | 74% Benzyl methyl sulfide. |
| 4-2 | n-Octyl Thiolacetate | 40% Ethyl n-octyl sulfide. |
| 4-3 | Cyclohexyl Thiolpivalate | 60% Cyclohexyl neopentyl sulfide.ᵃ |
| 4-4 | Cyclohexyl thiol-10-undecenoate | 79% Cyclohexyl 10-undecenyl sulfide.ᵇ |
| 4-5 | S-Ethyl cyclohexylcarbothioate | 61% Cyclohexylmethyl ethyl sulfide.ᶜ |
| 4-6 | Allyl Thiol-10-undecenoate | 89% Allyl 10-undecenyl sulfide ᵈ. |
| 4-7 | Methyl ferrocenylcarbothioate | 57% Ferrocenylmethyl methyl sulfide.ᵉ |
| 4-8 | Phenyl thiolacetate | 85% Thiophenol.ᶠ |
| 4-9 | Phenyl thiolbenzoate | Thiophenol, benzyl alcohol.ᶠ |

ᵃ Calcd. for C₁₁H₂₂S: C, 70.90; H, 11.90; S, 17.20. Found: C, 70.84; H, 12.00; S, 17.02.
ᵇ Calcd. for C₁₇H₃₂S: C, 76.10; H, 12.01; S, 11.94. Found: C, 75.79; H, 11.88; S, 11.76.
ᶜ B.P. 208–210° C.; $n_D^{25}$=1.4871. Calcd. for C₉H₁₈S: C, 68.27; H, 11.46. Found: C, 69.53; H, 11.63.
ᵈ $n_D^{22}$=1.4929.
ᵉ M.P. 39–41° C. Identification confirmed by infrared and NMR spectra.
ᶠ Cleavage product.

Example 5.—Reductions of thiolesters of ethyl substituted ferrocenes (A) To a stirred solution of 1.0 gram of LiAlH₄ in 100 ml. of diethyl ether was added 3.0 grams of aluminum chloride in 50 ml. of ether. There was then added a solution of 2.6 grams of 2-methylthiocarboxy-1,1'-diethylferrocene in ether. The reaction was completed and the reaction mixture worked up as described under Example 1A. A 92 percent yield (2.4 grams) of 2-(2-thiopropyl)-1,1'-diethyl ferrocene was obtained as an amber colored liquid which had a refractive index at 25° of 1.5901 and gave an infrared absorption spectrum characteristic of thioalkyl ferrocenes.

(B) In the identical manner of Example 5A, 3.0 grams of 3-methylthiocarboxy-1,1'-diethyl ferrocene was reduced in 70 percent yield to 3-(2-thiopropyl)-1,1'-diethyl ferrocene which was obtained as 2.1 grams of a liquid which had a refractive index at 25° of 1.5940 and gave an infrared absorption spectrum typical of thioalkyl ferrocenes.

I claim:
1. A process for the synthesis of an organic sulfide of the formula RCH₂SR' wherein R is an organic group and R' is a hydrocarbon group other than aryl, which comprises contacting an organic thiolester of the formula

with a mixture of LiAlH₄ and from 0.3 to 3.0 moles per mole LiAlH₄ of a Group III–A metal halide, the halide being one of chloride, bromide and iodide, in the presence of an ether diluent selected from the group consisting of di(C₁–C₄ alkyl) ethers and p-dioxane thereby reducing the thiolester to the corresponding organic sulfide.

2. The process of claim 1 wherein the metal halide is aluminum chloride.

3. The process of claim 2 wherein the mole ratio of aluminum chloride to LiAlH₄ is 0.8 to 1.2.

4. The process of claim 2 wherein from 1.0 to 1.2 moles of LiAlH₄ are used per mole of thiolester.

5. The process of claim 2 wherein the ether diluent is diethyl ether.

6. The process of claim 2 wherein the ether diluent is p-dioxane.

7. The process of claim 1 wherein R is selected from the group consisting of C₁–C₂₀ alkyl, alkenyl, cycloalkyl, aryl, and ferrocenyl groups and R' is selected from the group consisting of C₁–C₂₀ alkyl, alkenyl, and cycloalkyl groups.

References Cited

Eliel et al., J. Org. Chem. 29 (1964), pp. 1630–1.
Eliel et al., J. Am. Chem. Soc., 81 (1959), p. 6087.
Pettit et al., J. Org. Chem., 27 (1962), pp. 2127–2130.
Schlögl et al., Monatshefte für Chemie, 91 (1961), pp. 921–6.
Rainer et al., Am. Chem. Soc., Abstracts of Meeting No. 131 (1957), p. 51-0.

TOBIAS E. LEVOW, *Primary Examiner.*

A. P. DEMERS, *Assistant Examiner.*